United States Patent Office.

HENRY LAURENCE, OF NEW ORLEANS, LOUISIANA.

Letters Patent No. 92,460, dated July 13, 1869.

---

IMPROVEMENT IN VELOCIPEDES.

---

The Schedule referred to in these Letters Patent and making part of the same.

---

*To all whom it may concern:*

Be it known that I, HENRY LAURENCE, of the city of New Orleans, in the parish of Orleans, State of Louisiana, have invented a new and useful Improvement in Velocipedes; and I declare that the following is a clear, full, and exact description of the construction and operation of the same, reference being had to the annexed drawings, making a part of the specification, in which—

Figure 1 is a perspective view.
Figure 2 is a transverse section.
Like letters designate like parts.

The nature of my invention and improvement in velocipedes consists in providing the single or two-wheeled velocipede with one or more adjustable auxiliary wheels or casters, so united and connected with the velocipede, and actuated by suitable mechanical contrivance and device, as to enable the person operating the velocipede to place the casters or auxiliary wheels in contact with the plane or roadway upon which the velocipede is standing or moving, and to withdraw them from such contact, and suspend them in the air, at the will and convenience of the rider; such additional and auxiliary wheels being so arranged, with reference to the wheel or wheels proper of the velocipede, that when the same are in contact with the plane or roadway, on which the velocipede is situated, that together with the wheel or wheels proper of the velocipede, they will form a base or lateral support, and prevent the velocipede from capsizing and falling from its proper position by the action of its specific gravity, the object of my invention being to enable the person operating the velocipede to make a full stop, or proceed at a slow rate of speed, by the aid of the auxiliary wheels, without danger of capsizing or falling, and also enable him at will to obtain the full effect, benefit, and advantage of the single or two-wheeled velocipede, by simply removing the auxiliary wheels from contact with the roadway, and suspending them in the air.

To enable those skilled in the art to make and use my invention, I will proceed to describe its construction and operation.

I construct my velocipede in any of the known forms of velocipedes having less than three wheels, and which will not maintain an upright position at rest without support other than the wheel or wheels proper of the velocipede.

The drawing hereto annexed shows my improvement attached to the common form of two-wheeled velocipede; and in order to obviate the liability to fall of its own accord from an upright position, I use the auxiliary wheels or casters A and A². These wheels or casters may be constructed of any suitable material, and of any suitable or convenient size, and attached to any velocipede, substantially as hereinafter set forth.

The wheels A and A² are securely mounted at the lower extremities of the pivoted vibrating arms or levers B and B², so as to vibrate easily and freely on their centres, in the direction indicated by the arrow in dotted lines $a$ and $a^2$, in fig. 1.

The pivoted arms B and B² are securely pivoted at the points $b$ and $b^2$, or at any point on the reach or bar C, spanning and connecting the wheels proper of the velocipede, which connecting-bar or reach may be so shaped as to afford facility for pivoting the arms B and B² at any point above the point $b$, about which the wheel proper of the velocipede revolves, so as to give any desired length to B and B².

I so adjust the length of said arms that when they are in a perpendicular position, as shown in the annexed drawing, the lowest point of the disk of the wheels A and A², mounted in said arms, shall be in contact with the same plane upon which the wheel proper, D, is standing.

I mount and attach the said vibrating movable arms B and B², with their small wheels or casters attached, one on each side of the rear wheel proper, D, or the wheel which is not used for steering, as the case may be, at such a distance from said wheel, that the lateral distance between the wheels A and A², when mounted and in place, shall be sufficient, with the other wheels of the velocipede, to furnish full and adequate lateral support to the velocipede, and maintain it in an upright position, which distance will vary according to the height or construction of the velocipede to which my improvement is attached.

When the pivoted vibrating arms B and B² are pivoted, as in the annexed drawing, at the point about which the wheel proper, D, revolves, they may be attached firmly to a strong pin, which passes through the hub of the wheel D, and about which that wheel revolves, so that, by means of the pin, the two arms B and B² may be rigidly connected, and, with the pin as a fulcrum or pivot, move freely in the direction indicated by the arrow and dotted lines $a$ and $a^2$, or they may move loosely on the pin, and move independently of each other in the same direction, lifting the wheels A and A² free from contact with the roadway.

If any point above the centre of the wheel D is selected as the point of revolution or pivot of said arms, which is within the diameter of said wheel, then I pivot said arms independently, in any suitable manner, to the forked reach C, so that they act independently, when not otherwise connected by the device used to actuate them.

If the arms B and B² are constructed of sufficient length to require them to be pivoted at a point above and without the diameter of the wheel D, they can be either rigidly connected to the same rack-shaft or pin, or they may move independently, unless connected and compelled to act simultaneously by the mechanical device for actuating them.

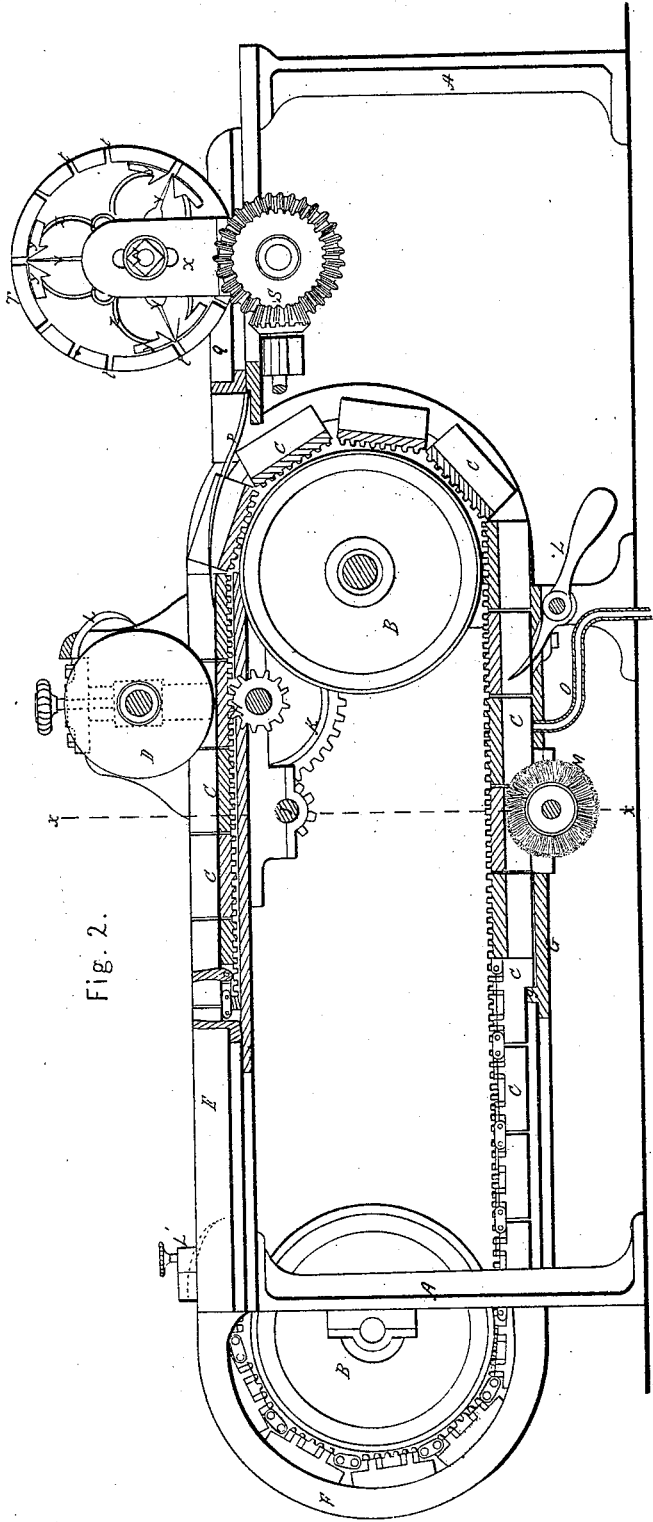

United States Patent Office.

PETER H. MAYO, OF RICHMOND, VIRGINIA.

Letters Patent No. 92,462, dated July 13, 1869.

MACHINE FOR MAKING PLUG TOBACCO.

The Schedule referred to in these Letters Patent and making part of the same.

*To all whom it may concern:*

Be it known that I, PETER H. MAYO, of Richmond, in the county of Henrico, and State of Virginia, have invented certain new and useful Improvements in Machines for Forming Bars, Strips, Lumps, or Plugs of Tobacco, and other similar substances; and I do hereby declare the following to be a full, clear, and exact description of the same, reference being had to the accompanying drawings, which are made part of this specification.

The subject of my invention is a machine of novel construction, adapted to form, in a superior manner, the "filler" of plug tobacco, and bars, strips, lumps, or plugs of other similar substances.

The loose leaf-tobacco, or other substance, after having been treated in the usual or any suitable manner, is placed, to a proper thickness or depth, in a revolving endless trough, and by it carried under a suitable roller, by which the necessary compression is imparted to it, and also, in connection with said trough, the desired form.

The strip or bar, as it passes from the roller, is released by the sides of the trough opening or being forced apart to a sufficient extent, and a tongue or wedge running under it, and then passes over a stationary table, where it is cut up into the desired lengths by a suitable cutting-apparatus. The machine is self-cleansing, is simple, strong, and durable in its construction, easy of operation, and not liable to get out of order.

My improvements consist, first, in constructing the revolving endless forming-trough, with sides adapted to open or be pressed apart, to release the bar or strip after it has been formed; also, in the provision of a novel combination of devices for cleansing and moistening said revolving trough and the pressing-roller, during the operation of the machine; also in a novel arrangement of devices for supporting said revolving trough and relieving it from strain; also, in connecting said revolving trough and roller, or the trough alone, to the driving-shaft by gearing, or other positive medium, so as to secure a steady and uniform movement of said parts; also in providing a tongue, or wedge, to project beneath the bar or strip, between it and the bottom of the trough, and, in connection with the expanding sides of the trough, to free said bar or strip from the trough, and cause it to pass on to a stationary table; also in adapting said tongue or wedge to open or press apart the sides of the trough, to release the bar or strip; also in a novel construction of cutting-apparatus, consisting of one or more revolving knives, operated by means of a hollow drum mounted on a different centre therewith, and thereby made to protrude, at the proper moment, to engage with the bar or strip, through slots in said drum, and return within said drum, after cutting through the bar or strip, thus cleansing themselves; also in the provision of spring-scrapers, for cleansing said knives, independent of the slots in their drum; also in adapting said knives to be adjusted, to cut different lengths of plug or lump, by mounting them separately on their shaft, and providing a plurality of differently-spaced slots in said drum for their reception; also in adapting said knives to cut at a greater or less depth, as desired; also in operating said knives in unison with the feeding and pressing-devices.

In the drawings—

Figure 1 represents a plan view of a machine embodying my improvements, a portion of the cutting-apparatus being broken away to more fully expose its construction.

Figure 2 is a side elevation of the same, partly in vertical section.

Figure 3 is a transverse section on the line $x$–$x$, figs. 1 and 2.

Figure 4 is a partial longitudinal section on the line $y$–$y$, fig. 1.

Figure 5 is a sectional perspective view, on a large scale, of one of the sections of the revolving trough detached.

Similar letters of reference indicate like parts in the several figures.

A represents a frame, of suitable form and dimensions, to adapt it to support the various operative parts of the machine, and which may be constructed in any suitable manner, and of any suitable material. The top of said frame may form a table, $a$, for the reception and manipulation of the material, before and after it has passed through the machine.

B B represent a pair of drums, mounted loosely, in suitable bearings, transversely of the frame A, parallel and at a suitable distance apart, and serving to support an endless revolving trough C, employed to receive and feed the tobacco, or other substance, to a compressing-roller, D, and in connection with said roller, to mould said material into the desired form of bar or strip.

The bottom $c$, and sides $c'$, of the trough C, may be made separate, and connected by a suitable hinge-joint, as shown, to adapt their sides to open, or be forced apart, to release the bar or strip after it is pressed, or they may be otherwise suitably adapted to so operate.

Said trough is composed of a number of sections (one of which is represented in fig. 5) of suitable length to adapt it to accommodate itself to the drums B, as represented in fig. 2, said sections being connected by pivoted links $c''$, or other suitable flexible media, or suitably hinged together.

The bottom and sides of said trough, between the points where the material to be treated is placed in it, and the pressed bar or strip is removed, are supported respectively by the surface of the table $a$, over which it passes, and by a pair of parallel perpendicular flanges, E, which serve to hold said sides of the trough in a proper position to form the sides of the bar or strip. Its sides are further supported at the ends by curved guides F, the rear of which is, for a portion, or the whole of their length, of a sufficiently greater distance apart than the width of the trough in its closed form, to allow the sides to open or be forced apart, as before described. It is further supported, on its under side, between the ends of the guides F, by a table, G, having suitable flanges $g$, for the support of the sides.

The roller D is mounted in vertically-adjustable bearings, sliding in slotted standards on top of the frame A, and adjusted or held, at the proper point, to form the desired thickness of bar or strip, by means of hand-screws, as shown, or in other suitable manner. Said roller is arranged at near the rear end of the trough C, and runs within it, as shown in figs. 2 and 3, being of equal width therewith, and of any desired diameter.

H represents a toothed pinion, employed to propel the revolving trough C, being arranged beneath said trough in a recess in the table, as shown in fig. 2, and mounted on a shaft parallel to, and preferably directly under the shaft of the roller D, as represented in said figure, and meshing with a rack, $c'''$, formed in or on the under side of the bottom $c$ of said trough, as shown, or constructed in corresponding sections, and attached thereto.

I represents gearing, employed to connect the shafts of the pinion H and the roller D, so as to cause them to rotate in unison, but which may be omitted, and the roller allowed to turn freely in its bearings if desired.

J represents the driving-shaft, which may be mounted parallel with the shafts of the pinion H, by which the revolving trough is propelled, and the roller D, as shown, and which is connected to the former by gearing K, so as to propel said trough by a positive movement.

L L' L'' represent scrapers applied to the trough C and roller D, to remove any matter which may adhere to them from the material being treated by the machine. Said scrapers may be of any suitable form, pivoted and weighted at their loose ends, as shown at L, or spring and adjustable by set-screw or not, as represented at L' and L'', or all of these forms may be employed in the most suitable positions, as shown, and any sufficient number of them may be employed.

M represents a brush, which may be rotary, as shown, or stationary, and of any suitable form and material employed, preferably behind the first scraper $L_1$ as shown in fig. 2, to further assist in cleansing the trough, said brush being operated from the driving-shaft J, by a band, N, passing around pulleys on its shaft and said driving-shaft, as shown in figs. 1 and 3, or in other suitable manner.

O represents a pipe passing through the table G, and discharging a jet of steam, or spray, into the chamber formed by the inverted trough and said table, to assist in cleansing the former, and also to moisten the same, to prepare it for the reception of the material to be moulded therein.

P represents a tongue, or wedge, projecting from the bed of a stationary trough, Q, behind, and in line with the revolving trough C, and serving, by running under the bar or strip, between it and the bottom of said trough C, to disconnect it therefrom, and cause it to pass into said stationary trough Q, said tongue P also serving, as shown, by being made tapering in width, to press apart the sides of said revolving trough, to relieve the sides of the bar or strip.

Arranged in the stationary trough Q, is a cutting-apparatus, driven in unison with the forming mechanism, and employed to feed the continuous bar or strip produced by said forming-mechanism, and cut the same into plugs or lumps of the desired length, being constructed and operated as follows:

R represents a roller arranged in the bed of the trough Q, and having its shaft connected, by suitable gearing S, to the driving-shaft J of the machine.

T is a hollow revolving drum, arranged a sufficient distance above the roller R, to accommodate the maximum thickness of bar or strip between, and connected with said roller by means of gearing U, so as to move in unison therewith.

V V V represent knives, of suitable construction, arranged within the drum T, operating through slots $t$ therein, and rotated thereby. Said knives are mounted loosely on a stud-shaft, W, eccentric to the drum T, its centre being below that of said drum, as shown.

The rotation of the knives V, by the drum K, causes them to be advanced thereout, and withdrawn or retracted, as indicated by the red circle in fig. 4, being within the drum, except when brought beneath it, and at their maximum projection in passing over the roller R, which forms their cutting-abutment. The knives are thus protected, and also adapted to cleanse themselves, either by the slots through which they are drawn, or a special provision hereafter described.

The stud-shaft W projects from a standard, X, which is slotted to allow its adjustment to increase or lessen its eccentricity, for the purpose of varying the extent of the projection of the knives as required.

The knives V being made separate, and the slots $t$ in the drum T, for their reception, being multiplied and suitably distanced, as shown, I am enabled readily to adjust the apparatus to cut any desired length, by simply employing a greater or less number of said knives, and arranging them accordingly.

Washers may be substituted for knives withdrawn, and removed to allow of the introduction of additional knives.

Y Y are scrapers arranged within the drum T, and on each side of the knives V V, to cleanse them as they are drawn in by the rotation of said drum, being pressed against the sides of the knives by springs Z.

The front of the drum T may be open, as shown, or closed by a suitable cap.

The motion of the roller R and drum T feeds the strip or bar, and the projection at intervals, of a knife, V, through one of the slots $t$ in said drum, severs a plug, or lump, of a length determined by the number of knives in said drum, and their consequent distance apart. The withdrawal of the knives into the drum again cleanses them.

The knives being supported, and the power applied to them at their outer ends, all straining of them is prevented. The entire arrangement is simple, compact, and strong, and performs its work in a very superior manner.

I propose, when preferred, constructing the revolving trough with spring sides instead of hinged, as shown and described, and connecting the sections together in any suitable manner; also employing any suitable means for opening or pressing apart the sides of said trough, to release the bar or strip, other than that described; also making the lateral supports of said trough adjustable in distance apart, to accommodate different widths of trough; also employing two or more sets of forming and cutting-devices, either similar, or adapted for different sizes of work, in a single machine; also employing friction-rollers in the table under the revolving trough, and in the supports of its sides, to facilitate its operation; also employing any suitable arrangement of belts and pulleys, or other suitable connection, wholly or in part, for connecting the various operative parts, instead of gearing, as shown and described; also employing the cutting-device without the adjustments as to depth and interval of cut, and, as dispensing with the latter adjustment, attaching the knives to a common hub.

The precise combination and arrangement of parts may also be varied, without departing from my invention.

Having thus described my invention,

What I claim as new therein, and desire to secure by Letters Patent is—

1. The revolving endless trough C, constructed with sides, adapted to open or be pressed apart to release the strip or bar, substantially as described, 2. In combination with the revolving endless trough C, and compressing-roller D, the scrapers L L' L", and brush M, employed and operating substantially as set forth for the purposes named.

3. In combination with the revolving endless trough C, the table G, and the steam or spray-pipe O, arranged and operating as described for the purpose specified.

4. In combination with the revolving trough C, constructed in sections, with sides adapted to open or be pressed apart as described, the tables $a$ and G, and flanges or guides E, F, $g$, arranged substantially as represented and described for the purposes specified.

5. In combination with the revolving trough C, the gearing $c'''$, H, K, for connecting said trough with the driving-shaft J, and imparting a positive motion thereto from said shaft as described.

6. The tongue or wedge P, arranged and operating substantially as described, to free the strip or bar from the bottom of the revolving trough, and cause it to pass on to a stationary table, as set forth.

7. The tongue or wedge P, constructed tapering in width, to adapt it to force apart the sides of the revolving trough to release the bar or strip, substantially as described.

8. The rotary knives V, one or more, mounted eccentrically in a slotted drum, T, and operated by said drum, thereby causing them, in their rotation, to protrude at the proper moment to sever the plug or lump, and then withdraw within said drum, so as to be protected thereby, and to cleanse themselves.

9. The spring-scrapers Y arranged within the drum T, and employed to cleanse the knives V as they are drawn into said drum, substantially as described.

10. The knives V, mounted, loosely and separately, on their shaft, and employed, in combination with a drum, T, provided with a plurality of slots, $t$, for their reception, as described, for the purpose of adapting the apparatus to be adjusted to cut different lengths of plug or lump.

11. In combination with the stud-shaft W of the knives, the standard X slotted as described, to adapt said knives to project a greater or less distance, as desired.

12. The cutting-apparatus R T V, connected with the forming-mechanism by gearing S U as represented and described, for the purpose specified.

PETER H. MAYO.

Witnesses:
E. R. MEANLEY,
WM. L. P. MAYO.